United States Patent [19]
Matthias

[11] Patent Number: 5,243,817
[45] Date of Patent: Sep. 14, 1993

[54] THRUST REVERSER FOR FAN JET AIRCRAFT ENGINES

[75] Inventor: Gregory H. Matthias, Chula Vista, Calif.

[73] Assignee: Rohr, Inc., Chula Vista, Calif.

[21] Appl. No.: 548,610

[22] Filed: Jul. 5, 1990

[51] Int. Cl.$^5$ .............................. F02K 3/02
[52] U.S. Cl. .................. 60/226.2; 244/110 B; 239/265.29
[58] Field of Search .............. 60/226.2, 230; 244/110 B; 239/265.27, 265.29

[56] References Cited

U.S. PATENT DOCUMENTS

| | | | |
|---|---|---|---|
| 3,605,411 | 9/1971 | Maison et al. | 60/226.2 |
| 4,382,551 | 5/1983 | Thayer | 60/226.2 |
| 4,894,985 | 1/1990 | Dubois et al. | 60/226.2 |
| 4,916,895 | 4/1990 | Dubois | 60/230 |
| 4,960,243 | 10/1990 | Dubois et al. | 60/226.2 |
| 5,003,770 | 4/1991 | Schegerin et al. | 60/230 |
| 5,039,171 | 8/1991 | Lore | 239/265.29 |

Primary Examiner—Richard A. Bertsch
Assistant Examiner—Michael I. Kocharov
Attorney, Agent, or Firm—P. J. Schlesinger; Frank Gilliam

[57] ABSTRACT

A fail-safe pivot door-type aircraft turbine engine thrust reverser which includes a plurality of pairs of pivoting doors on the blocker and deflector sides of openings in a fan jet nacelle. The doors form a flush surface along the nacelle exterior and the fan duct flow path when stowed during normal engine operation in flight. When the doors are deployed in thrust reversing mode, an extensible actuator causes them to translate aft in the opening, with one end of the blocker door moving to at least partially block airflow through the duct and divert it out along the door through the opening uncovered by door deployment. The deflector door pivots outwardly to extend the door length and further direct airflow out and forward along the outside of the nacelle. Upon initiation of deployment, a cooperating pin and track assembly causes the door to initially translate inwardly, then rearwardly, after which the pivoting action begins. This initial "over-center" movement prevents accidental deployment in flight, even if all latches and actuators are disconnected and assures tight sealing around the door during normal flight.

16 Claims, 6 Drawing Sheets

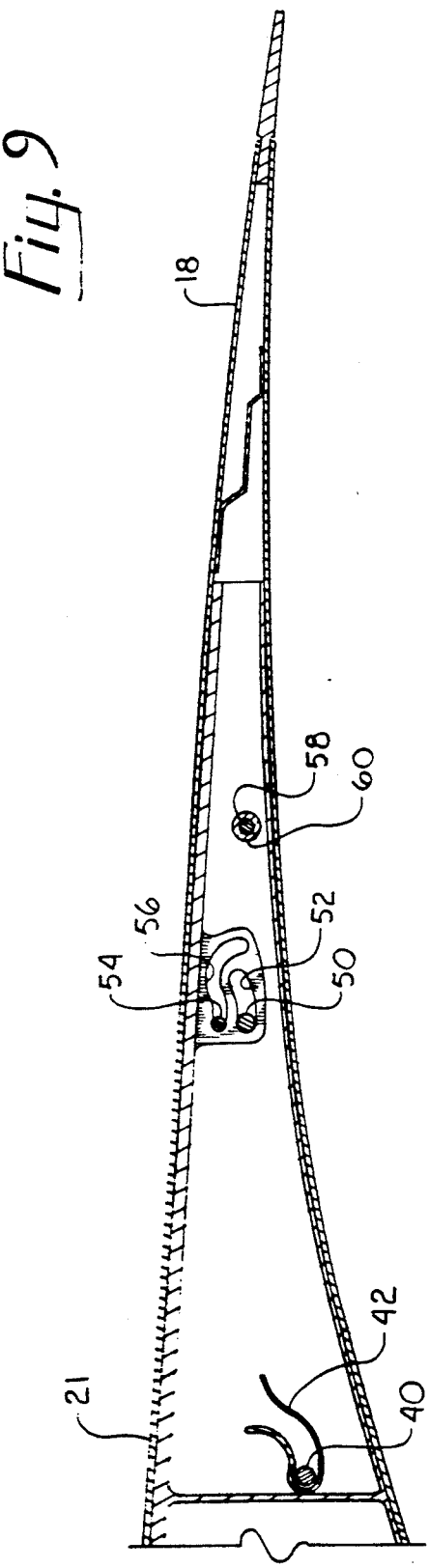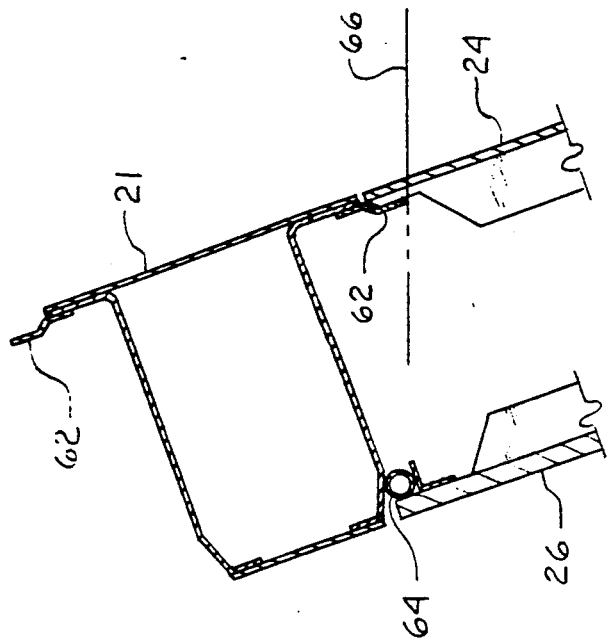

THRUST REVERSER FOR FAN JET AIRCRAFT ENGINES

BACKGROUND OF THE INVENTION

This invention relates in general to pivot door-type aircraft turbine engines and, more particularly, to such a pivoting thrust reverser door arrangement which includes mechanisms to prevent accidental deployment in flight.

Modern aircraft fan jet engines have a nacelle or shroud surrounding the engine, spaced outwardly from the core engine cowl to define an annular passage or duct for flow of air rearwardly from the fan portion of an enlarged axial flow compressor. In this type of engine, a large proportion of the total thrust is developed by the reaction to the air driven rearward by the fan and the balance results from ejection of the exhaust gas stream from the engine.

Aircraft using engines of this type tend to have high landing speeds, placing great stress on wheel braking systems and requiring very long runways. To reduce this braking requirement and permit use of shorter runways, means are now provided in such engines for reversing at least a major portion of engine thrust during the landing roll. Many different types of thrust reversers have been designed, of varying effectiveness.

One type, primarily used with non-fan type turbine engines, uses large, sturdy clam shell-like blocker doors which swing directly behind the jet exit nozzle and diverge forwardly to reverse thrust. This system must be very heavy and strong and is not easily applied to fan jet engines.

Another type of thrust reverser uses cascade sets in the sidewalls of the shroud or deflector housing with devices for uncovering the cascades and blocking airflow through the annulus aft of the cascades to direct airflow through the cascades, which turn the airflow in a reverse direction. Typical cascade-type thrust reversers include those disclosed by Montgomery in U.S. Pat. No. 4,145,877 and Hom et al in U.S. Pat. No. 3,500,646. While often effective, these systems are mechanically complex, requiring a great many cooperating components. Failure of these components could in some cases cause actuation in flight.

Still another design uses pivotable doors lying in openings in the sidewall of the shroud or nacelle which pivot outwardly while a second set of doors pivot inwardly to block flow of air through the duct and direct it to the outwardly extending door which direct airflow rearwardly. Typical of these is the system disclosed by Ellis in U.S. Pat. No. 3,612,401. This system, while useful, tends to be heavy and mechanically complex, so that the possibility exists of system failure and at least partial thrust reversal occurring in flight.

Yet another design uses a plurality of pivotable doors located in openings arranged radially around the shroud. Each door pivots so that one end contacts the engine cowl blocking airflow through the annular duct while the other end extends outside the nacelle in a direction directing airflow rearwardly. Typical of these is the system disclosed by Maison et al in U.S. Pat. No. 3,605,411. While having greater mechanical simplicity than other systems, it is difficult with this arrangement to provide optimum duct airflow blocking and optimum flow re-direction in the reverse direction. Accidental release of stowage latches or failure of other components could cause inadvertent actuation.

Thus, there is a continuing need for improved thrust reversing systems for use in ducted fan jet engines which combine highly effective flow reversal with low cost, light-weight, mechanical simplicity, ease of maintenance and prevention of accidental deployment due to system failures.

SUMMARY OF THE INVENTION

The above-noted problems, and others, are overcome by the thrust reverser system of this invention which basically comprises a thrust reverser of the pivoting door-type wherein a radially arranged series of openings around a fan jet nacelle are filled with door assemblies moveable between stowed and deployed positions.

Each door assembly includes a first or deflector door which fills the opening in the deflector nacelle skin during normal engine operation and a second or blocker door which fills the opening in the blocker skin of the nacelle. These first and second doors are linked together for movement together.

An extensible actuator interconnects the nacelle to move the doors between the stowed position with the doors flush with the nacelle and the deployed position with the doors moved aft in the opening, with the first door extending outwardly and forwardly of the opening and the second door extending inwardly to at least partially divert airflow out through the opening.

A cooperating pin and track assembly is provided between the doors and nacelle and is configured to force the doors to move slightly inwardly of the opening as movement aft begins. This releases seals between doors and opening edges without significant sliding movement and prevents accidental deployment of the doors due to failure of seals, latches, actuator components or the like during normal flight operation. In flight, the nacelle interior is at high pressure, preventing any inward door movement except when driven by the extensible actuator.

As is readily apparent, accidental deployment of thrust reversers in flight, particularly in one of several engines, can have very serious consequences. While present commercial thrust reversers have a variety of latches and safety devices to prevent accidental thrust reverser deployment, none are as simple, lightweight and dependable as this arrangement.

BRIEF DESCRIPTION OF THE DRAWING

Details of the invention and of preferred embodiments thereof will be further understood upon reference to the drawing, wherein:

FIG. 9 is a detail section view of the aft portion of the island adjacent to a thrust reverser assembly, taken substantially along the same line as FIG. 8; and FIG. 10 is a detail section view taken on line 10—10 in FIG. 1.

DETAILED DESCRIPTION OF PREFERRED EMBODIMENT

Figure 1:
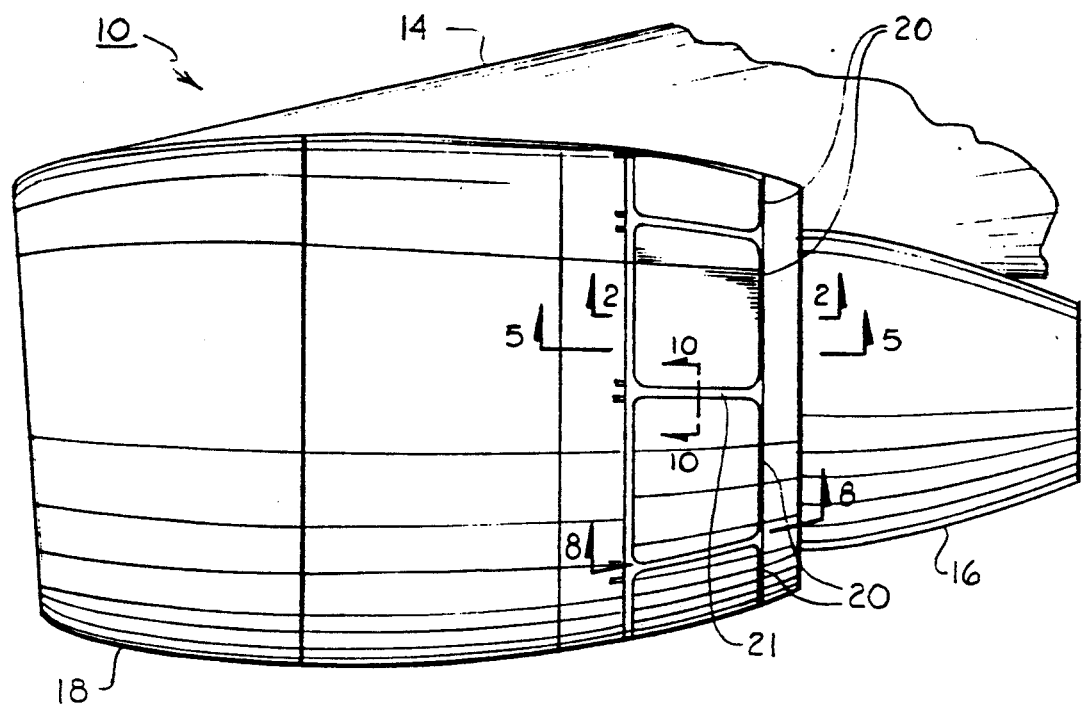
FIG. 1 is a schematic perspective view of a fan jet engine utilizing the thrust reverser system of this invention.

Referring now to FIG. 1, there is seen a conventional fan jet engine 10 connected to an aircraft wing (not shown) by a pylon 14. Engine 10 includes a core 16 and a fan nacelle 18. Near the aft end of nacelle 18 is located a plurality of thrust reverser assemblies 20 having deflector doors which are flush with the deflector surface of nacelle 18 during normal flight operation of the engine. As detailed below, when thrust reversers 20 are moved to the deployed positions, they direct air exiting the openings filled by the thrust reversers outwardly and forwardly of engine 10. Portions of the nacelle extend between thrust reversers 20, forming islands 21 which engage the sides of each assembly 20.

Figure 2:
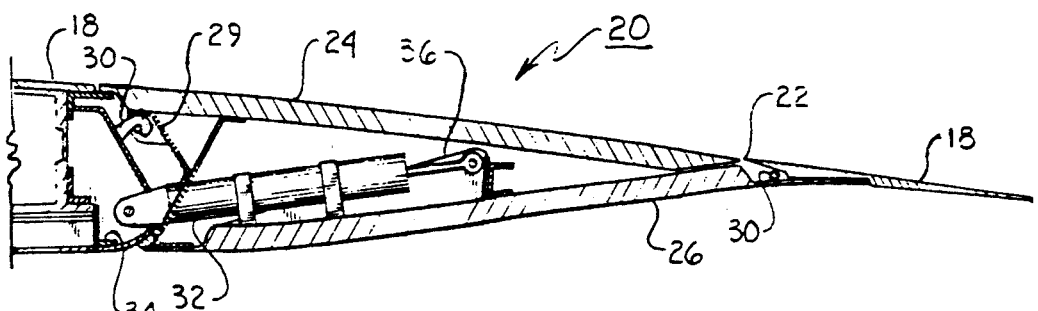
FIG. 2 is a schematic axial section view, taken on line 2—2 in FIG. 1, showing the thrust reverser in the stowed position.
Figure 3:
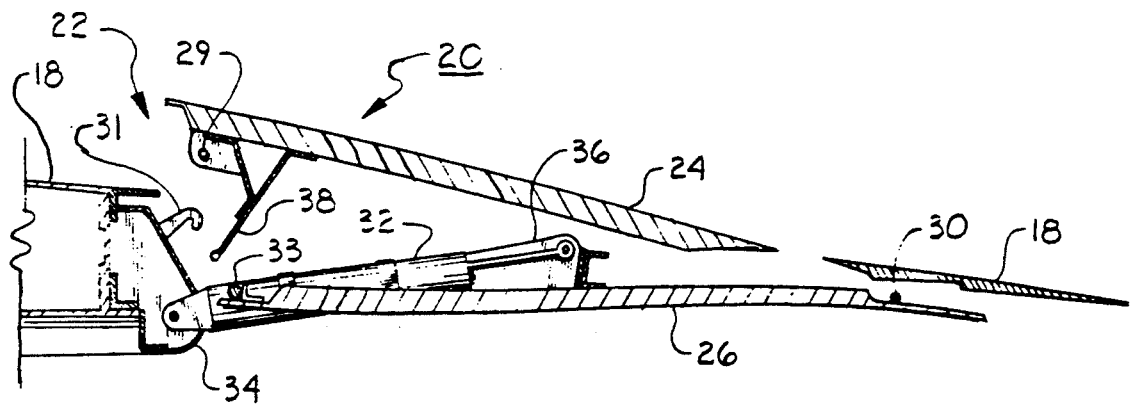
FIG. 3 is a schematic axial section view, substantially as seen in FIG. 2, but with the thrust reverser partially deployed.
Figure 4:
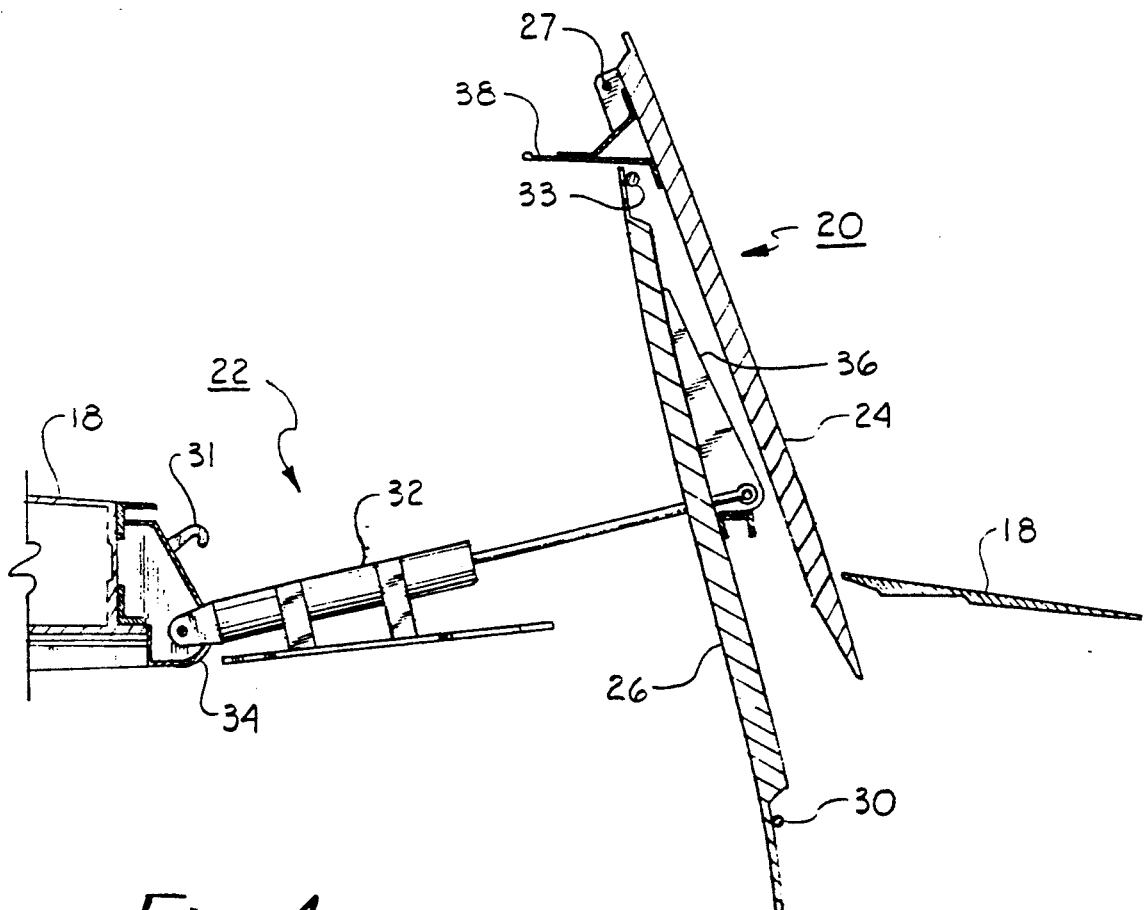
FIG. 4 is a schematic axial section view, substantially as seen in FIG. 3, but with the thrust reverser fully deployed.
Figure 5:
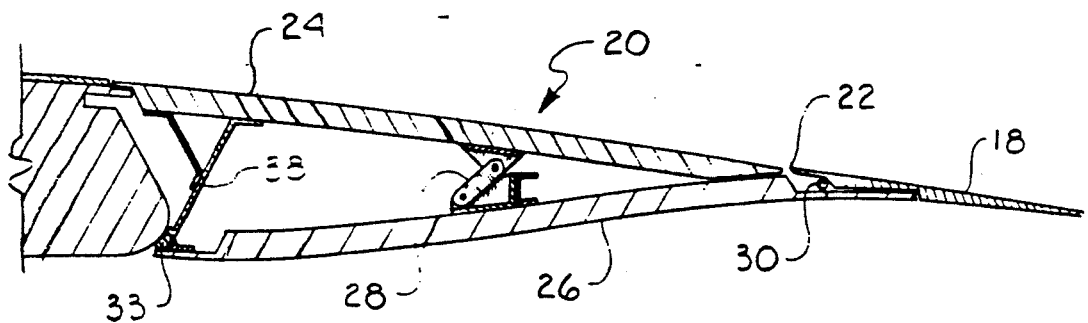
FIG. 5 is a schematic axial section view, taken on line 5—5 in FIG. 1, showing the thrust reverser in the stowed position.
Figure 6:
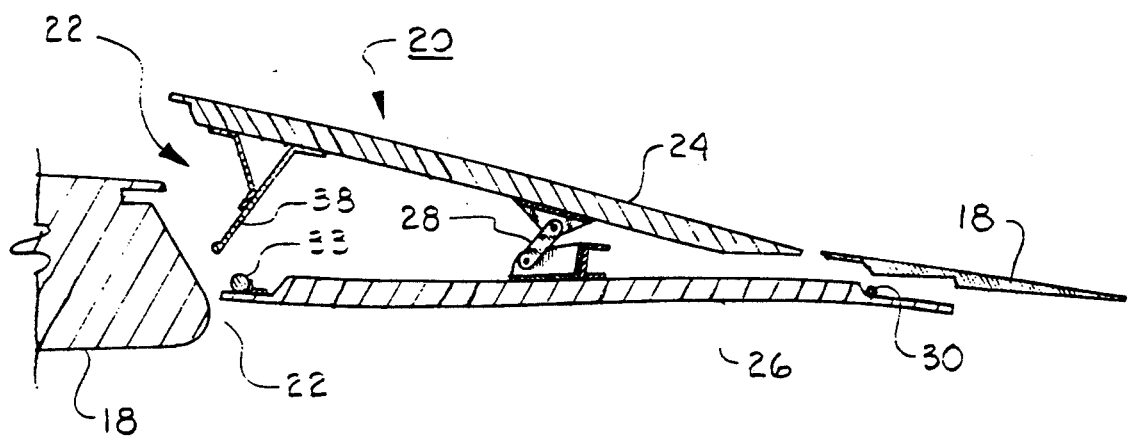
FIG. 6 is a schematic axial section view, substantially as seen in FIG. 5, but with the thrust reverser fully deployed.
Figure 7:
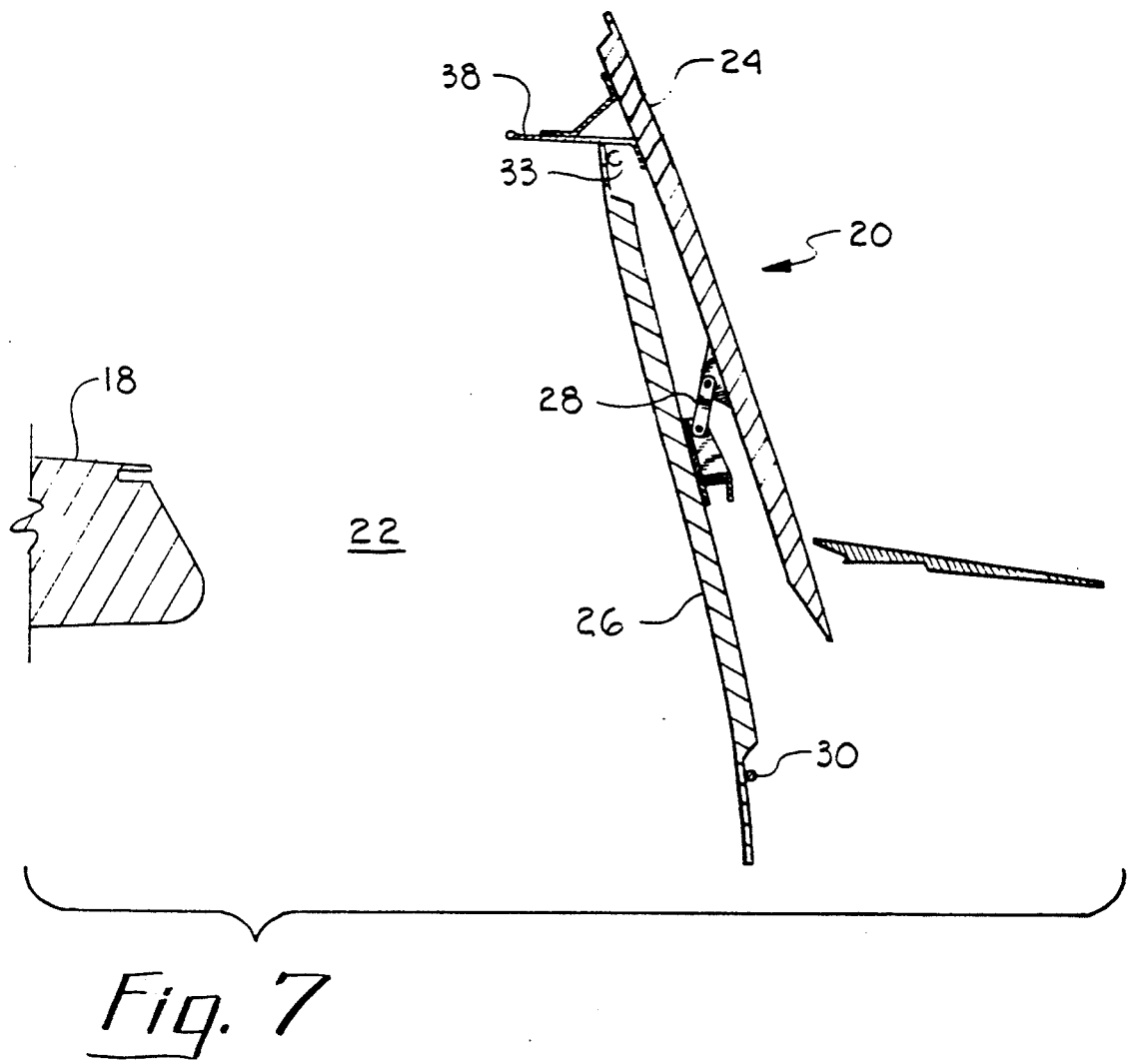
FIG. 7 is a schematic axial section view, substantially as seen in FIG. 6, but with the thrust reverser fully deployed.

FIGS. 2, 3 and 4 show the thrust reverser 20 in axial section views taken near the thrust reverser axial centerline, with the door in the stowed, partially deployed and fully deployed positions, respectively, to show the actuator assembly. FIGS. 5, 6 and 7 show similar views, with the section taken about half-way between the axial edge and the reverser centerline to show the inter-door link assembly.

Considering FIGS. 2 and 5 together, there is seen an opening 22 in nacelle 18 in which the thrust reverser assembly 20 fits. Deflector door 24 closes the opening 22 in the outer skin of nacelle 18 and a blocker door 26 closes the opening in the blocker nacelle skin. Links 28 (FIG. 5) connect the blocker and deflector doors together while allowing limited relative movement during deployment.

Deflector door 24 is latched in the closed position by a pin 29 which engages a hook 31.

As best seen in FIG. 2, an extensible actuator 32 is connected between a bracket 34 on nacelle 18 and a bracket 36 on blocker door 26. Actuator 32 may be any extensible means, such as a hydraulic or pneumatic cylinder, a lead screw or the like. Actuator 32 is located on the centerline of the door assemblies 20. Actuator 32 enters a notch or slot (not seen) in blocker door 26 during deployment, as best indicated in FIGS. 3 and 4.

Conventional pin and slot interconnections (not shown) between the side edges of the doors and the side edges of islands 21 provide for the necessary translation and pivoting of the doors during deployment in a conventional manner. As is detailed in conjunction with the description of FIG. 8 below, during deployment the door 26 initially translates slightly inwardly of nacelle 18, to unlatch pin 29 from hook 31 then translate further aft while pivoting into the fully deployed position.

In the stowed position, seals 30 and 33 on blocker door 26 seal the interface between opening 22 and door 26 to prevent undesirable leakage of the high pressure air from within nacelle 18.

Movement of the pair of doors between the stowed and deployed positions is best shown in FIGS. 3 and 4 and FIGS. 5 and 6. As actuator 32 extends, blocker door 26 initially moves inwardly of nacelle 18 and rearwardly, as seen in FIG. 3. An opening in the inner wall of the blocker door 26 allows the actuator 32 to pass there through. During this movement, linkage 28 on blocker door 26 begins to rotate in a counter-clockwise direction, causing upward movement of the forward end of deflector door 24.

As actuator 32 continues to extend, the door assembly 20 reaches the fully deployed position shown in FIGS. 4 and 7. Blocker door extends inwardly, generally into contact with core 16 to deflect airflow out through opening 22. Linkage 28 as seen in FIG. 7 has rotated completely, so that deflector door extends outwardly. A plate 38 extends forwardly from the upper end of deflector door 24 to further deflect airflow in the reverse direction.

Figure 8:
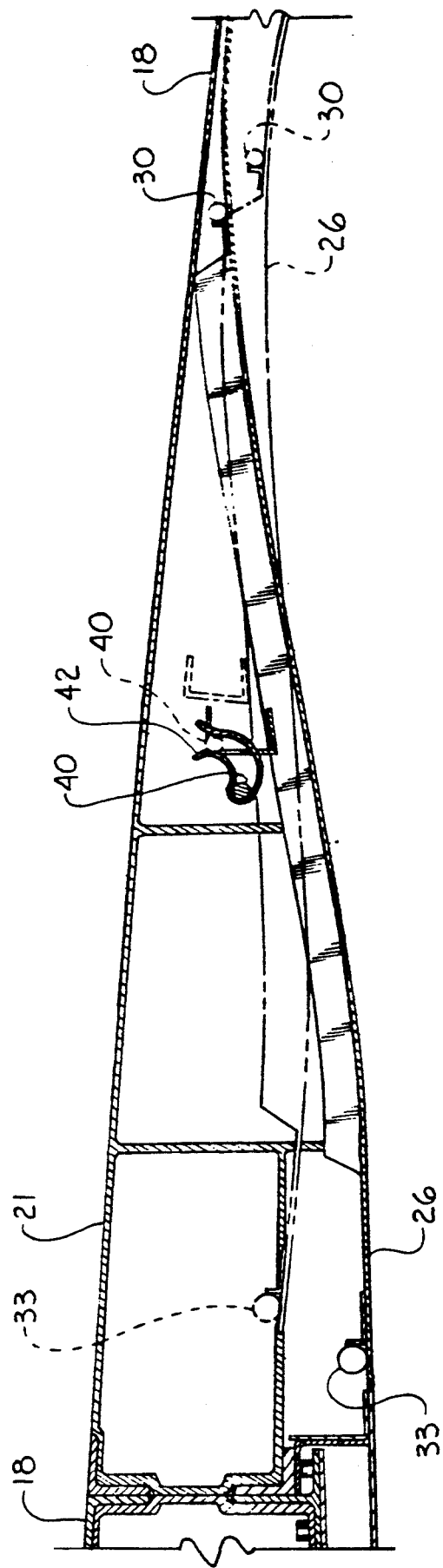
FIG. 8 is a schematic section view taken on line 8—8 in FIG. 1, showing details of the pin and track interconnection.

As mentioned above, when actuator 32 begins the movement of thrust reverser assembly from the stowed toward the deployed position, a pin 40 moves in a slot 42 as seen in FIG. 8 and 9. Slot 42 is mounted in island 21 along one edge of blocker door 26, with pin 40 mounted on blocker door 26. As can be seen from the shape of slot 42, when door 26 is driven aft by the actuator, pin 40 causes the door to initially move downwardly (toward the inside of the engine), then outwardly toward the deployed position. The door 26 is shown in phantom in FIG. 8 as pin 40 exits slot 42 and full deployment begins.

Blocker door 26 also has a pivot pin 50 extending into a slot 52 in island 21 and a cam follower pin 54 extending into a cam slot 56 as seen in FIG. 9. As blocker door 26 begins to open, pins 40 and 50 move inwardly of nacelle 18 and to the right as seen in FIG. 9, moving the door inwardly and to the right. Eventually, pin 40 exits slot 42, as discussed above, and pin 50 reaches the right end of slot 52. Then the blocker door 26 rotates to the deployed position as pin 54 continues to move along slot 56. This sequence is reversed in moving blocker door 26 from the deployed to the stowed position. Simultaneously, deflector door 24 pivots about a door pin 58 in a socket 60 in island 21 while linked to blocker door 26, as described above.

As seen in FIG. 10, island 21 is positioned between adjacent thrust reverser assemblies and contains the various pin receiving slots shown in FIG. 9 (not seen in FIG. 10). Island 21 includes offset strips 62 which support the edges of deflector door 24 in the stowed position. Strips 62 are offset sufficiently to produce a smooth external nacelle surface when the doors are stowed. Seal 64 carried by doors seals between the edge of blocker door 26 and the edge of island 21. When the doors are deployed, because of the round shape of the nacelle 18, the edge of door 26 moves approximately along line 66 to clear strips 62.

Since the nacelle interior is under considerable air pressure during normal flight due to pressure if the fan stream, the thrust reverser assembly 20 can not be moved accidentally toward the deployed position, even if latch 30 or other components were damaged. Only actuator 32 can deploy the door assembly under almost all circumstances.

The thrust reverser is returned to the normal flight condition by retraction of actuator 32 which moves doors 24 and 26 toward opening 22, with linkage 28 rotating in a clockwise direction. As the assembly nears closure, pin 40 enters slot 42, door 26 moves slightly inwardly of the stowed position and finally moves to the fully stowed position with pin 40 positioned fully into slot 42.

While certain preferred arrangements and configurations were detailed in the above description of a preferred embodiment, those can be varied, where suitable, with similar results. Other applications, variations and ramifications of the present invention will become apparent to those skilled in the art upon reading this disclosure. Those are intended to be included within the scope of this invention, as defined in the appended claims.

I claim:

1. A thrust reverser for a gas turbine aircraft engine which comprises:

a deflector door in a stowed position adapted to fill an opening in the exterior skin of an engine nacelle during normal engine operation;

a blocker door in a stowed position adapted to fill an opening in the inner skin of said nacelle during normal engine operation;

said inner and outer skin openings being substantially coextensive;

means for moving said doors between said stowed positions and deployed positions near the aft end of said openings in which said deflector door extends radially outwardly and forwardly of said opening and said blocker door extends radially inwardly into the fan stream airflow through said nacelle to at least partially divert said fan stream airflow radially outwardly through said opening in a reverse thrust direction;

said moving means including linkage means interconnecting said deflector and blocker doors and an extensible actuator interconnecting said nacelle and doors for moving said doors between said stowed and deployed positions; and cooperating pin and track means between said doors and said nacelle configured to cause said blocker door to initially move slightly inwardly of said opening as movement from the stowed to deployed position begins, whereby the linked doors are prevented from accidentally moving from the stowed to the deployed position through failure of any component of said moving means.

2. The thrust reverser according to claim 1 wherein said linkage means includes a rotatable link to move said deflector door outwardly relative to said blocker door during deployment.

3. The thrust reverser according to claim 1 further including a narrow island portion of said nacelle extending between adjacent thrust reversers.

4. The thrust reverser according to claim 3 wherein two of said track means are secured to islands on opposite sides of each thrust reverser and two of said pins are coupled in a cooperating relationship in said track means on opposite sides of each of said blocker doors.

5. The thrust reverser according to claim 4 wherein said track means have a closed end adapted to receive pins in the thrust reverser fully stowed position, a curved portion extending from said closed end toward the nacelle centerline and then radially away from said centerline and an open second end from which said pin may exit during completion of deployment.

6. The thrust reverser according to claim 1 including seals adapted to seal interfaces between thrust reversers and nacelle openings when said thrust reversers are in the stowed position.

7. The thrust reverser according to claim 1 wherein said extensible actuator is a pneumatic or hydraulic cylinder or a lead screw.

8. The thrust reverser according to claim 1 wherein a plurality of assemblies of deflector and blocker doors are provided in openings radially arranged around said nacelle.

9. In a thrust reverser for a gas turbine aircraft engine which comprises a deflector door having a stowed position filling an opening in the exterior skin of an engine nacelle during normal engine operation, a blocker door having a stowed position filling an opening in the inner skin of said engine nacelle during normal engine operation, and means for moving said doors between said stowed position and a deployed position near the aft end of said opening in which said deflector door extends radially outwardly and forwardly of said opening and said blocker door extends radially inwardly into the fan stream airflow through said nacelle to at least partially divert said airflow out through said openings in a reverse thrust direction, linkage means interconnecting said deflector and blocker doors, extensible actuator means interconnecting said nacelle and said blocker door for moving said linked doors between said stowed and deployed positions, and cooperating pin and track means between said doors and said nacelle to cause said blocker door to move slightly inwardly of said nacelle as movement from the stowed position to the deployed position begins, whereby the linked doors are prevented from accidentally moving from the stowed to the deployed position while the engine is in normal operation.

10. The improvement according to claim 9 wherein said linkage means includes a rotatable link to move said deflector door outwardly relative to said blocker door during deployment.

11. The improvement according to claim 9 further including a narrow island portion of said nacelle extending between adjacent thrust reversers.

12. The improvement according to claim 11 wherein two of said track means are secured to islands on opposite sides of each thrust reverser and two of said pins are positioned in a cooperating relationship in said track means on opposite sides of each of said blocker doors.

13. The improvement according to claim 12 wherein track means have a closed end adapted to receive pins in the thrust reverser fully stowed position, a curved portion extending radially inwardly from said closed end toward the nacelle centerline and then away from said centerline and an open second end from which said pin may exit during completion of deployment.

14. The improvement according to claim 9 including seals adapted to seal interfaces between thrust reversers and nacelle openings when said thrust reversers are in the stowed position.

15. The improvement according to claim 9 wherein said extensible actuator is a pneumatic or hydraulic cylinder or a lead screw.

16. The improvement according to claim 9 wherein a plurality of assemblies of deflector and blocker doors are provided in openings radially arranged around said nacelle.

* * * * *